(12) United States Patent
Shin et al.

(10) Patent No.: US 10,742,157 B2
(45) Date of Patent: Aug. 11, 2020

(54) VEHICLE AND METHOD OF CONTROLLING THE SAME

(71) Applicants: Hyundai Motor Company, Seoul (KR); Kia Motors Corporation, Seoul (KR)

(72) Inventors: YoungJin Shin, Gyeongsangnam-do (KR); Dongyeon Han, Seoul (KR); Sanghoon Moon, Gyeonggi-do (KR); Kyungsoo Park, Daejeon (KR); WoongChan Chae, Daejeon (KR); Hyoungjun Cho, Gyeonggi-do (KR); Jung Shik Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/284,531

(22) Filed: Feb. 25, 2019

(65) Prior Publication Data

US 2020/0153377 A1 May 14, 2020

(30) Foreign Application Priority Data

Nov. 8, 2018 (KR) .................. 10-2018-0136614

(51) Int. Cl.
*H02P 29/66* (2016.01)
*B60L 50/60* (2019.01)
*B60L 15/20* (2006.01)

(52) U.S. Cl.
CPC ............ *H02P 29/662* (2016.11); *B60L 15/20* (2013.01); *B60L 50/60* (2019.02); *B60L 2210/40* (2013.01);
(Continued)

(58) Field of Classification Search
None
See application file for complete search history.

(56) References Cited

U.S. PATENT DOCUMENTS

| 2004/0257011 A1* | 12/2004 | Rechberger | ............... H02P 9/00 318/139 |
| 2009/0033260 A1* | 2/2009 | Fernengel | ............... H02P 23/14 318/400.07 |

(Continued)

FOREIGN PATENT DOCUMENTS

| KR | 10-2013-0123866 A | 11/2013 |
| KR | 10-1394548 B1 | 5/2014 |

*Primary Examiner* — Bentsu Ro
(74) *Attorney, Agent, or Firm* — Mintz Levin Cohn Ferris Glovsky and Popeo, P.C.; Peter F. Corless (57) ABSTRACT

A vehicle and method of controlling the same are provided in which the performance of an electric motor is prevented from being degraded by efficiently and more accurately calculating the temperature of a permanent magnet within the electric motor to adjust the amount of power supplied to the electric motor. The vehicle includes an electric motor having a stator, a rotor, and a permanent magnet and a sensor that measures the temperature of the electric motor. An inverter drives the electric motor and a controller generates a predetermined heat quantity by supplying power to the electric motor to calculate the temperature of the permanent magnet based on the temperature of the electric motor at a predetermined point measured using the sensor. When the temperature of the permanent magnet exceeds a predetermined temperature, the controller reduces the supply of the power.

14 Claims, 7 Drawing Sheets

(52) U.S. Cl.
CPC ..... *B60L 2240/425* (2013.01); *H02P 2207/05* (2013.01)

(56) References Cited

U.S. PATENT DOCUMENTS

| | | | | |
|---|---|---|---|---|
| 2009/0174351 A1* | 7/2009 | Eisenhardt | .......... | H02P 29/0241 318/400.21 |
| 2009/0284202 A1* | 11/2009 | Miura | .............. | G01K 7/42 318/473 |
| 2012/0242268 A1* | 9/2012 | Yashiro | .............. | H02P 27/085 318/503 |
| 2013/0342137 A1* | 12/2013 | Yamaguchi | .......... | H02P 29/662 318/400.3 |
| 2016/0091568 A1* | 3/2016 | Weber | .............. | G01R 31/343 318/490 |

* cited by examiner

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2018-0136614, filed on Nov. 8, 2018, the disclosure of which is incorporated herein by reference.

BACKGROUND

1. Field of the Disclosure

The present disclosure relates to a vehicle including an electric motor and a method of controlling the same, and more particularly, to a control method that prevents the performance of the electric motor from being degraded by efficiently and accurately calculating the temperature of a permanent magnet provided in the electric motor.

2. Description of the Related Art

Generally, a vehicle refers to a mode of transportation, designed to travel on a road or railway using fossil fuel, power, and the like as a power source. Vehicles using fossil fuels may emit fine dust, water vapor, carbon dioxide, carbon monoxide, hydrocarbons, nitrogen, nitrogen oxides and/or sulfur oxides due to combustion of fossil fuels. Water vapor and carbon dioxide are known as factors causing global warming, and fine dust, carbon monoxide, hydrocarbons, nitrogen oxides, and/or sulfur oxides are known as air pollutants that may harm people.

Accordingly, vehicles using environmentally friendly energy that replace fossil fuels have recently been developed. For example, an electric vehicle (EV) using electric energy as a main energy source is being developed. Electric vehicles require a high-voltage battery capable of storing electric energy, an electric motor that operates as a power source, and an inverter for driving the electric motor.

Meanwhile, a permanent magnet mounted within the electric motor is degraded in performance as the temperature of the electric motor increases. Particularly, performance of irreversible permanent magnets is deteriorated at below a particular temperature. Since the permanent magnet of the electric motor is positioned on a rotor and rotated, a temperature sensor is unable to be attached to the permanent magnet. Additionally, since the temperature of the permanent magnet is unable to be determined, an irreversible demagnetization occurs during a temperature increase, and thus the performance of the motor is degraded permanently. Accordingly, there is a need for a technique for deriving the temperature of the permanent magnet and preventing the permanent demagnetization.

SUMMARY

Therefore, it is an object of the present disclosure to provide a vehicle and a method of controlling the same that may prevent the performance of the electric motor from being degraded by efficiently and more accurately calculating the temperature of a permanent magnet mounted within the electric motor and adjusting the amount of power supplied to the electric motor. Additional aspects of the invention will be set forth in part in the description which follows and, in part, will be obvious from the description, or may be learned by practice of the invention.

Therefore, an aspect of the present invention provides a vehicle that may include: an electric motor having a stator, a rotor, and a permanent magnet; a sensor configured to measure a temperature of the electric motor, an inverter configured to drive the electric motor; and a controller configured to generate a torque in the electric motor by supplying power to the electric motor through the inverter, and calculate a temperature of the permanent magnet based on a previously calculated amount of heat generation corresponding to the torque, and reduce supply of the power when the temperature of the permanent magnet exceeds a predetermined temperature.

The controller may further be configured to generate iron loss of the rotor and eddy-current loss of the permanent magnet through the inverter. The controller may correspond the electric motor to the thermal equivalent circuit including at least one electric component. The controller may form a thermal model that corresponds to the rotor, the stator, and the permanent magnet using the thermal equivalent circuit.

The vehicle may further include a sensor configured to measure a temperature of at least one point of the rotor, wherein the controller may be configured to generate a predetermined heat quantity of heat by supplying power to the electric motor through the inverter, calculate the temperature of the permanent magnet based on the temperature of the at least one point of the rotor measured using the sensor, and reduce supply of the power when the temperature of the permanent magnet exceeds a predetermined temperature. The sensor may be configured to measure temperatures of at least two points of the electric motor, and the controller may be configured to calculate the temperature of the permanent magnet based on a difference between the temperatures of the at least two points. The controller may then be configured to supply the electric motor with the power required for driving the electric motor.

According to another aspect of the present invention a method of controlling a vehicle may include: generating a torque in an electric motor by supplying power to an electric motor through an inverter; calculating a temperature of a permanent magnet mounted within the electric motor based on a previously calculated amount of heat generation corresponding to the torque; and reducing supply of the power when the temperature of the permanent magnet exceeds a predetermined temperature.

The generating of the previously calculated amount of heat may include generating iron loss of a rotor mounted within the electric motor and eddy-current loss of the permanent magnet through the inverter. The calculating of the permanent magnet may include corresponding the electric motor to a thermal equivalent circuit including at least one electric component. Additionally, the calculating of the permanent magnet may include forming a thermal model that corresponds to a rotor, a stator, and the permanent magnet using the thermal equivalent circuit.

The method may further include measuring a temperature of at least one point of a rotor, wherein the calculating of the permanent magnet may include: generating a predetermined heat quantity of heat by supplying power to the electric motor through the inverter; and calculating the temperature of the permanent magnet based on the temperature of the at least one point of the rotor measured using the sensor.

The measuring of the predetermined point of the electric motor may include measuring temperatures of at least two points of the electric motor, and the calculating of the temperature of the permanent magnet may include calculating the temperature of the permanent magnet based on a difference between the temperatures of the at least two points. The supplying of power to the electric motor may include supplying the electric motor with the power required for driving the electric motor.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of embodiments of the present disclosure will be described, and description of what are commonly known in the art or what overlap each other in the exemplary embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network. Although the terms "first," "second," "A," "B," etc. may be used to describe various components, the terms do not limit the corresponding components, but are used only for the purpose of distinguishing one component from another component. Reference numerals used for method steps are just used for convenience of explanation, but not to limit an order of the steps. Thus, unless the context clearly dictates otherwise, the written order may be practiced otherwise.

Figure 1:
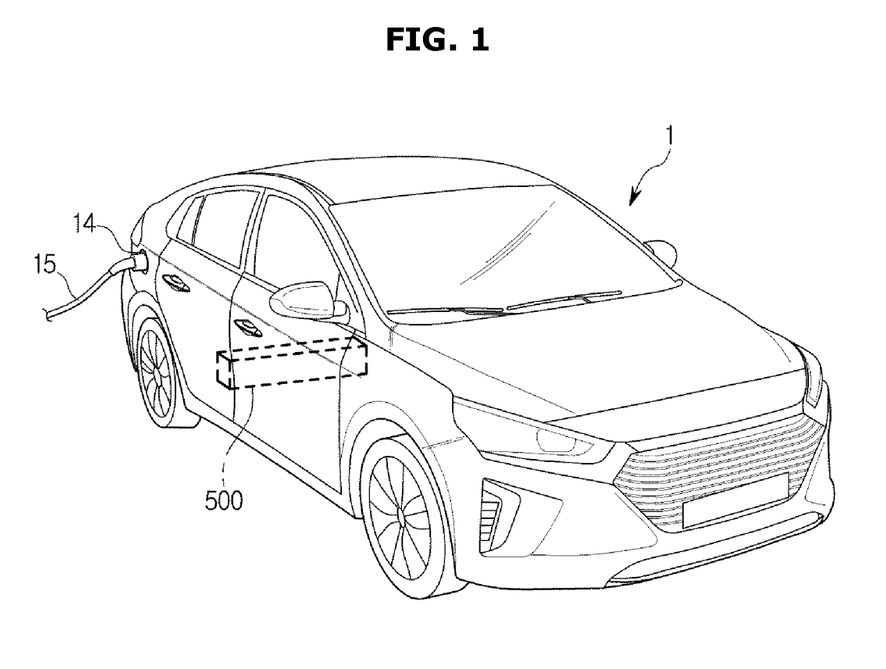
FIG. 1 is a view illustrating the external appearance of a vehicle according to an exemplary embodiment.

Hereinafter, the operating principles and exemplary embodiments of the disclosure will be described with reference to the accompanying drawings. FIG. 1 is a view illustrating the external appearance of a vehicle according to an exemplary embodiment. Referring to FIG. 1, a vehicle 1 according to an exemplary embodiment may use electric energy as a main energy source, and may include an electric motor 100 and a high-voltage battery 500 configured to store power for driving the electric motor 100.

In a general internal combustion engine vehicle, an auxiliary battery for supplying electric energy to electric components of a vehicle is disposed on one side of an engine compartment. However, in the case of the vehicle 1 operating on electric energy, the high-voltage battery 50 having a large-capacity and large size is required. In the vehicle 1 according to the exemplary embodiment, the high-voltage battery 500 may be installed below two rows of passenger seats. Power stored in the high-voltage battery 500 may be used to drive the electric motor 100 to generate power. In particular, the high-voltage battery 500 may be a lithium battery.

The electric vehicle 1 may include a charging port 14. A charging connector 15 of an external charging facility may be connected to the charging port 14, and when electric energy is supplied from the charging connected 15, the high-voltage battery 500 may be charged. Various types of external chargers including a high-speed battery charger 150 may be used to charge the high-voltage battery 500 of the vehicle 1.

The high-speed battery charger 150 may include a commercial high-speed battery charger capable of charging the high-voltage battery 500 with a direct voltage of 400V and a high-voltage high-speed battery charger capable of charging the high-voltage battery 500 with a high level of direct voltage of 800V. To charge the high-voltage battery 500, the high-speed battery charger 150 may be configured to convert commercial alternating current (AC) power into a direct current (DC) voltage of 400 V or 800 V, and supply the converted power to the vehicle 1.

The high-voltage battery 500 may have a charging voltage of about 500V to 800 V, and when the voltage capacities of the high-voltage battery 500 and the high-speed battery charger 150 are different from each other, a compatibility issue occurs. Particularly, to remove the compatibility issue between the high-voltage battery 500 and the high-speed battery charger 150, the electric motor 100 and an inverter 300 may be disposed between an output terminal of the high-speed battery charger 150 and the high-voltage battery 500 in the vehicle 1, to boost the voltage.

When the voltage of the external high-speed battery charger 150 is too low or insufficient to charge the high-voltage battery 500, the voltage supplied from the high-speed battery charger 150 may be boosted to a level sufficient to charge the high-voltage battery 500. Accordingly, the electric motor 100 and the inverter 300 may operate as a step-up converter, and a coil of the electric motor 100 may be an inductor. The inverter 300 may include a plurality of switches.

The combination of the inductor of the electric motor 100 and the switches of the inverter 300 constitutes a booster type step-up circuit and thus, an input voltage may be boosted to a level sufficient to charge the high-voltage battery 500. Meanwhile, when the high-voltage battery 500 is charged using the high-speed battery charger 150, the vehicle 1 may not run and the electric motor 100 may not be driven. In this case, a rotor of the electric motor 100 may be in a stationary state. Additionally, magnetoresistance through the rotor in a three-phase coil of the electric motor 100 may vary depending on the position of the rotor of the electric motor 100. As the magnetoresistance varies, the inductance of each winding may vary, and when a current for charging flows through each winding, unintentional torque and torque ripple may occur in the rotor.

Figure 2:
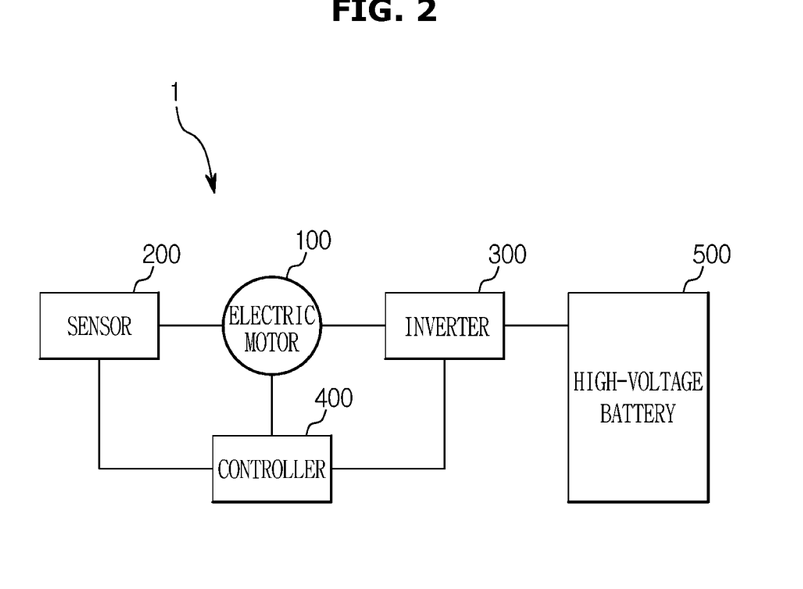
FIG. 2 is a control block diagram illustrating a vehicle according to an exemplary embodiment.
Figure 3:
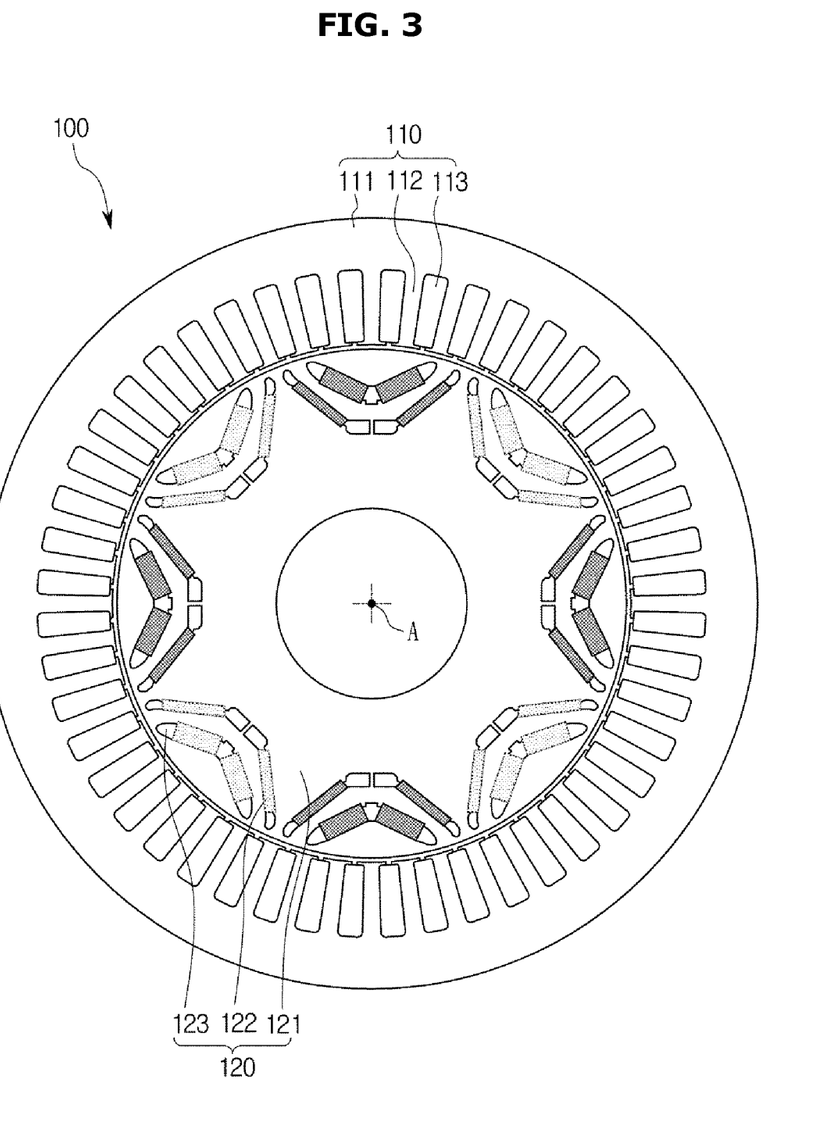
FIG. 3 is a view illustrating the configuration of an electric motor of a vehicle according to an exemplary embodiment.

The vehicle 1 according to the exemplary embodiment may reduce vibration and noise of the vehicle 1 that occurs during charging of the high-voltage battery 500 in the vehicle 1 based on the stationary state of the electric motor 100. Hereinafter, the configuration and operation of the vehicle 1 according to the exemplary embodiment will be described in detail. FIG. 2 is a control block diagram illustrating the vehicle according to the exemplary embodiment, and FIG. 3 is a view illustrating the configuration of the electric motor of the vehicle according to the exemplary embodiment.

Referring to FIG. 2, the vehicle 1 according to the exemplary embodiment may include an electric motor 100 configured to generate kinetic energy and electric energy, an inverter 300 configured to drive the electric motor 100, a high-voltage battery 500 configured to store electric energy therein, a controller 400 configured to execute charging of the high-voltage battery 500, and a sensor 200. The high-voltage battery 500 may be provided to store electrical energy.

Particularly, the electric energy stored in the high-voltage battery 500 may be charged from an external power source, or may be supplied from the electric motor 100. When supplied from the electric motor 100, the high-voltage battery 50 may be supplied with electric energy generated from regenerative brake. The inverter 300 may be configured to supply a driving current to the electric motor 100. In particular, the inverter 300 may be configured to operate the electric motor 100 by varying the voltage and frequency of input electric power and supply the power to the electric motor.

In addition, the inverter 300 may be configured to output three-phase AC power required for driving the electric motor 100 from a DC voltage. The inverter 130 may include a plurality of switches configured to permit or block the flow of current, and the electric motor 100 may be supplied with alternating current based on a switching operation of the plurality of switches. When an external voltage for charging the high-voltage battery 500 is applied, the plurality of switches of the inverter 300 may boost the applied voltage to a level sufficient to charge the high-voltage battery 500 together with the inductor of the electric motor 100.

Furthermore, the sensor 200 may be configured to measure the temperature of the electric motor. The sensor 200 may be configured to measure the temperature of at least one point of the stator or the rotor mounted within the electric motor 100. The sensor 200 may additionally be configured to measure the temperatures of at least two points of the electric motor 100. According to one exemplary embodiment, the sensor 200 may be installed adjacent to a stator coil of the electric motor 100, and may be installed on a portion of the stator coil having a highest temperature (e.g., a lower side of an end coil). The sensor 200 may be configured to sense the temperature of the electric motor 100 and a signal of the sensing may be transmitted to the controller 400 and used to determine whether to cool the electric motor 100.

The sensor 200 may be configured separately from the electric motor 100 as shown in FIG. 2, or the sensor 200 may be included within the electric motor 100. The electric motor 100 may be configured to generate kinetic energy and electric energy, and may be configured to convert electric energy into kinetic energy (rotational force), as well as converting kinetic energy (rotational force) into electric energy. When the vehicle 1 is traveling on a downhill road or is being decelerated (regenerative braking) by the operation of the electric motor 100, the electric motor 100 may be configured to generate power, and the power generated by the electric motor 100 may be used to charge the high-voltage battery 500.

As described above, when the electric motor 100 is not driven to charge the high-voltage battery 500, the coil of the electric motor 100 may serve as the inductor and configured to boost the applied voltage. The controller 400 may be configured to supply power to the electric motor through the inverter to generate a torque in the electric motor. A torque generated by the electric motor 100 may be determined in advance to correspond to the supplied power.

The controller 400 may be configured to store a previously calculated amount of heat generation that corresponds to the torque in advance. In particular, the controller may be configured to estimate a heat quantity of heat generated when the electric motor is driven based on a previously stored analysis table. The controller 400 may be configured to calculate the temperature of the permanent magnet and reduce supply of the power when the temperature of the permanent magnet exceeds a predetermined temperature. The controller 400 may be configured to supply power to the motor 100 through the inverter 300 to generate a predetermined heat quantity of heat.

Additionally, the controller 400 may be configured to calculate the temperature of the permanent magnet based on the temperature of a predetermined point of the electric motor measured by the sensor 200. The controller 400 may then be configured to reduce the supply of the power when the temperature of the permanent magnet exceeds a predetermined temperature. The controller 400 may be configured to generate an iron loss of the rotor and an eddy-current loss of the permanent magnet using the inverter 300. The iron loss of the rotor 120 represents power loss of the rotor caused by the magnetizing force which changes with time. The eddy current of the permanent magnet represents power loss due to eddy current.

The controller 400 may associate the electric motor 100 to a thermal equivalent circuit composed of at least one electric element. The thermal equivalent circuit is a representation of the flow of heat flow in the form of an electronic circuit. Details of the thermal equivalent circuit may be described below. In particular, the controller 400 may form a thermal model that corresponds to the rotor, the stator, and the permanent magnet using the thermal equivalent circuit. The controller 400 may be configured to calculate the temperature of the permanent magnet based on the temperature of at least one point of the electric motor 100. The controller 400 may then be configured to calculate the temperature of the permanent magnet based on a difference between temperatures of at least two points. The calculating of the temperature of the permanent magnet based on the temperature difference may be achieved using the thermal transfer circuit.

The controller 400 may include a memory (not shown) configured to store data regarding an algorithm for executing the operations of components in the vehicle and a program reproducing the algorithm, and a processor (not shown) for performing the above-described operation using the data stored in the memory. In particular, the memory and the processor may be implemented as separate chips. Alternatively, the memory and the processor may be implemented as a single chip.

It would be understood by those skilled in the art that at least one component may be added or omitted to corresponding to the performances of the components shown in FIG. 2, and the mutual positions of the components may be changed to correspond to the performance or structure of the system. Each of the components shown in FIG. 2 refers to a software component and/or a hardware component, a Field Programmable Gate Array (FPGA) and an Application Specific Integrated Circuit (ASIC).

Referring to FIG. 3, the electric motor 100 of the vehicle according to the exemplary embodiment may include a stator 110 fixed by an external support structure, a rotor 120 rotated by magnetic interaction with the stator 110, and a rotating shaft A for transmitting the rotating force of the rotor 120 to an external load. In addition, the electric motor 100 according to the exemplary embodiment may be an inner type motor in which the rotor 120 formed in a circumferential shape is positioned inside the stator 110 formed in a cylindrical shape and rotates. The stator 110 may be formed in a cylindrical shape having a hollow center, and the rotor 120 may be rotatably inserted into the hollow portion of the stator 110.

Referring to FIG. 3, the stator 110 may include a stator main body 111 having an annular shape, a plurality of teeth 112 that protrude from the stator main body 111 toward the rotating shaft A, a coil (not shown) that winds an outer surface of the teeth 112. The stator main body 111 may have a cylindrical shape and may be fixed to an inner surface of a motor case (not shown). The teeth 112 may protrude radially from an inner circumferential surface of the stator main body 111 toward the rotor 120. The teeth 112 may be a structure integrally formed with the stator main body 111 described above. The stator main body 111 and the teeth 112 may be manufactured by stacking metal plates having a shape of a combination of the stator body 111 and the teeth 112 in the direction of the rotating shaft A.

The respective teeth 112 may be disposed at regular intervals along the inner circumferential surface of the stator main body 111, and a slot 113 may be formed between teeth 112 adjacent to each other among the teeth 12. A coil (not shown) may be implemented by a winding wound around the outer surface of the teeth 112 through the slots 113 formed between the adjacent teeth 112. The coil (not shown) may be a winding formed of an electrically conductive material through which electric current flows, along the outer surface of each tooth 112. When an electric current flows in the coil (not shown), a magnetic field perpendicular to an end surface of the tooth may be formed inside the coil (not shown), that is, on the tooth 112.

Figure 4:
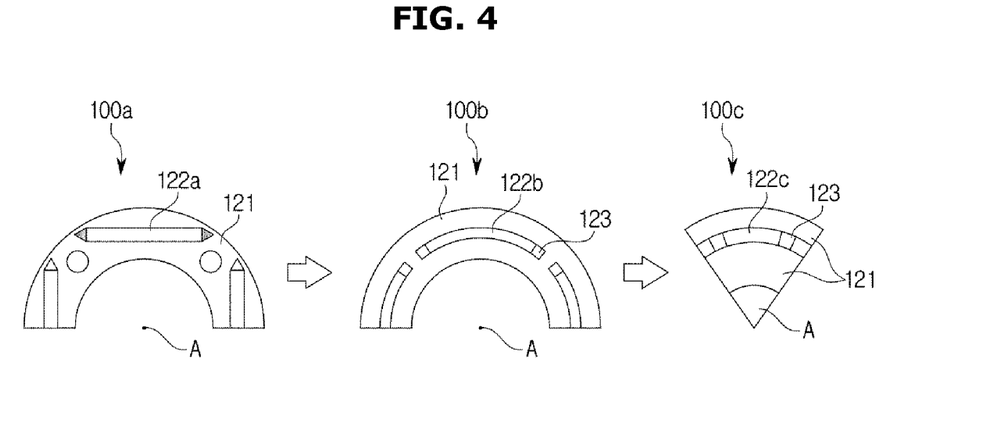
FIG. 4 is a schematic view illustrating the configuration of an electric motor according to an exemplary embodiment.

The electric motor 100 according to the exemplary embodiment may include forty eight teeth 112 as shown in FIG. 3, and thus may include forty eight slots 113, however this is merely exemplary and the present disclosure is not limited thereto. The rotor 120 may be disposed in the hollow portion of the stator 110 as described above and may rotate about the rotating shaft A by magnetic interaction with the stator 110. The rotor 120 may include a rotor body 121 formed in a circumferential shape and a permanent magnet group 122 disposed inside the rotor body 121 as shown in FIG. 4. In addition, a magnetic flux barrier group 123 may be formed adjacent to the permanent magnet group 122 in the rotor body 121.

Since the rotor 120 may include the permanent magnet group 122 therein, the electric motor 100 according to the exemplary embodiment may be a permanent magnet (PM) electric motor. In particular, the electric motor 100 according to the exemplary embodiment may be an interior permanent magnet (IPM) electric motor in which the permanent magnet group 122 is submerged in the rotor body 121. The rotor body 121 may have a circumferential shape having the rotating shaft A as a center thereof, and may be formed of a magnetic material magnetized by a magnetic field. The rotor body 121 may be manufactured by stacking metal plates having a shape of the rotor body 121.

Permanent magnet groups 122 adjacent to each other among the permanent magnet groups 122 may be arranged such that different magnetic polarities are directed to the outside of the rotor body 121. For example, in the rotor body 121, an N pole and an S pole may be alternately formed along the outer peripheral surface of the rotor body 121. The magnetic flux barrier group 123 may include a plurality of magnetic flux barriers formed of a nonmagnetic material that interferes with the magnetic flux generated by the permanent magnet group 122. For example, a magnetic flux barrier that interferes with the magnetic flux may be implemented by forming an aperture at a position that corresponds to the magnetic flux barrier group 123.

A magnetic force may be generated between the stator 110 and the rotor 120 of the electric motor 100. Accordingly, when the high-voltage battery 500 is charged using the high-speed charger 150, unintentional torque and torque ripple may occur due to the position of the stopped rotor 120. Thus, adjustment of the position of the stopped rotor 120 is required. Accordingly, the controller 400 may be configured to change the position of the rotor 120 based on whether the above-described position of the rotor 120 coincides with a predetermined position, and after the changing of the position of the rotor 120, operate the inverter 300 to charge the high-voltage battery 500. In particular, the predetermined position may refer to a position in which the electric motor 100 generates a smallest cogging torque, and also may refer to a position in which the electric motor 100 generates a smallest torque ripple. In addition, the predetermined position may be the center of the stator coils.

FIG. 4 is a schematic view illustrating the configuration of the electric motor according to an exemplary embodiment. Referring to FIG. 4, the electric motor may include the rotor 120, the rotating shaft A, and the permanent magnet 122 similar to FIG. 3.

The electric motor may have a configuration 100a simplified using mellor thermal network. The existing permanent magnet may be equated as a configuration 100b, and then may be provided as a configuration 100c based on structural continuity. Such a simplified electric motor may be reconstructed as a schematic diagram including a rotating shaft A, a rotor 121 and permanent magnets 122a, 122b and 122c. Meanwhile, the electric motor 100 according to the exemplary embodiment may include a magnetic flux barrier 124. The magnetic flux barrier 124 may be provided as a configuration capable of adjusting the flow of the magnetic flux of the electric motor 100. Based on the simplified configuration 100c, a thermal equivalent circuit may be constructed as will be described below, and the controller 400 may be configured to calculate the temperature of the permanent magnet 122c based on the thermal equivalent circuit.

Figure 5:
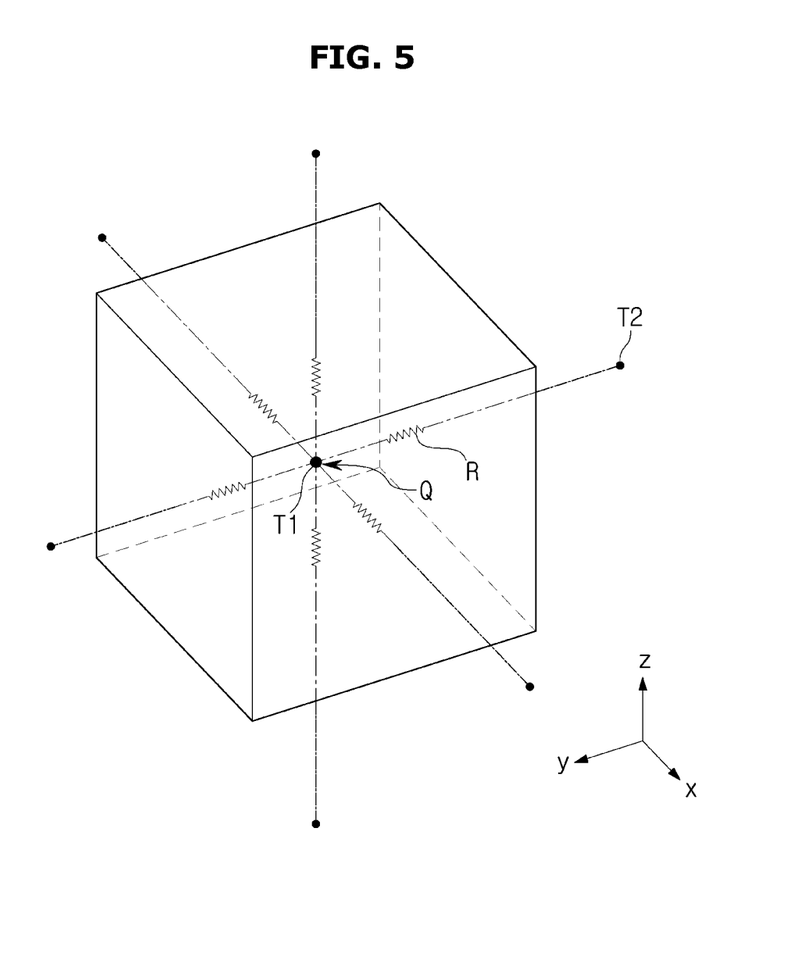
FIG. 5 is a view for describing the operation of a thermal equivalent circuit according to one exemplary embodiment.

FIG. 5 is a view for describing the operation of the thermal equivalent circuit according to an exemplary embodiment. The flow of heat in the electric motor 100 has components, such as temperature, heat quantity, heat resistance, and heat charging. Such components may correspond to forms of electronic circuits. For example, the difference in temperature causing the flow of heat may correspond to the voltage, and the flow of a heat quantity of heat may correspond to the flow of current. In addition, the thermal resistance may correspond to a resistance in an electronic circuit. Meanwhile, the flow of a heat quantity of heat in the thermal equivalent circuit may be expressed by Equation 1.

$$Q = \frac{\Delta T}{R} \quad \text{Equation 1}$$

wherein, Q denotes heat quantity, T denotes temperature, and R denotes resistance.

Therefore, when the heat quantity applied to one point, the heat resistance, and the temperature of the one point may be determined, the temperature of another point may be calculated inversely. For example, when a heat quantity Q is applied to T1 and the temperature is measured to be T4. Since the thermal resistance R is a predetermined value and ΔT is derived as T4-T1, the value of T1 may be calculated inversely.

According to the exemplary embodiment, the controller 400 may be configured to supply the heat quantity Q to a predetermined point using the inverter, and the sensor 200 may be configured to measure the temperature at one point of the electric motor 100, and since the thermal resistance R is predetermined, the temperature at a point that corresponds to T1 may be derived without directly measuring the temperature. As will be described later, the heat quantity may include iron loss of the rotor and eddy current loss of the permanent magnet 122. According to the exemplary embodiment, when the temperature of the permanent magnet 122 derived as such exceeds a predetermined temperature, the controller 400 may be configured to reduce the power supplied to the electric motor 100.

Figure 6:
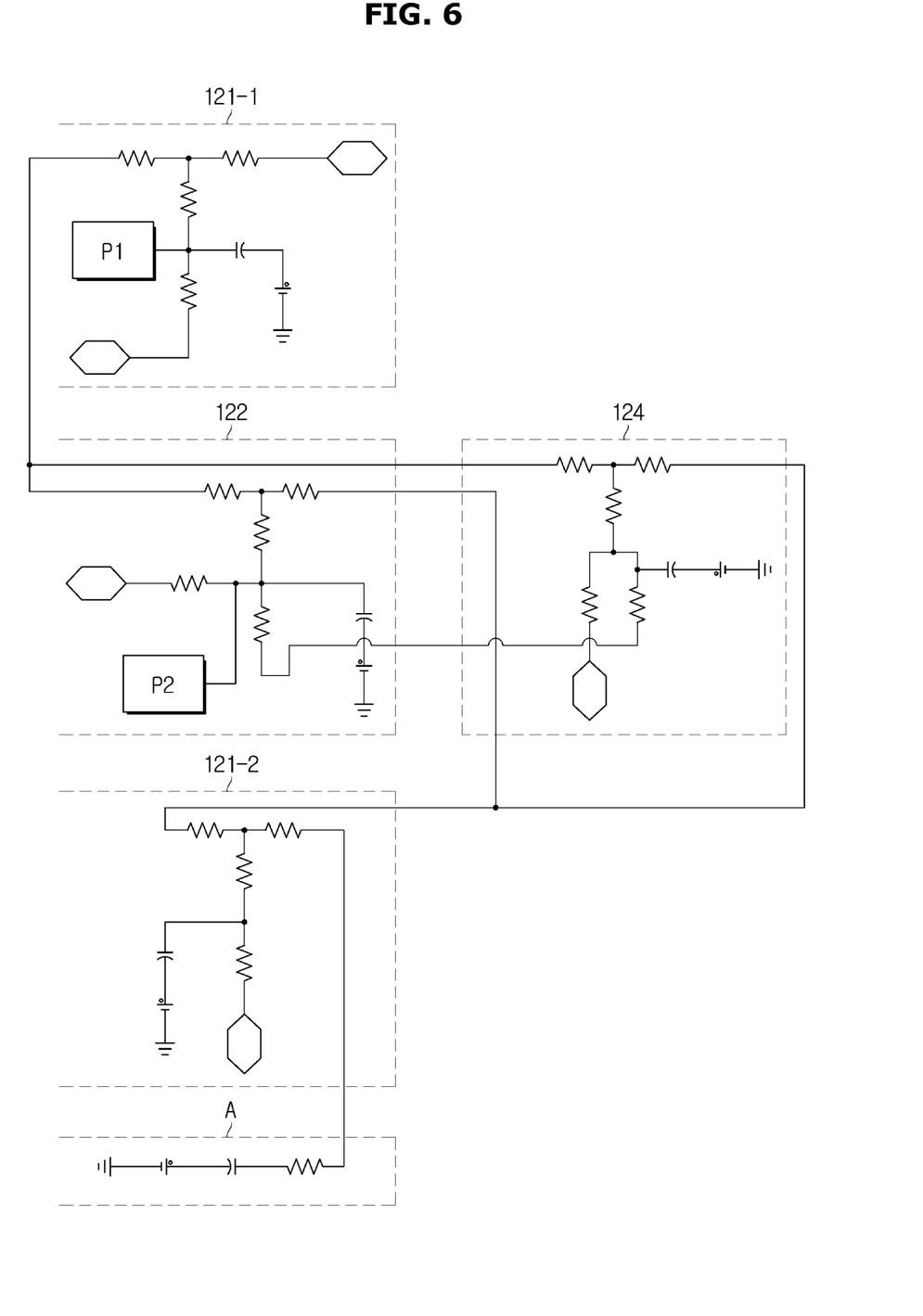
FIG. 6 is a view in which a configuration of an electric motor corresponds to a thermal equivalent circuit according to an exemplary embodiment.

As the descriptions for FIG. 5 are merely exemplified for purposes of describing the structural and functional descriptions of the thermal equivalent circuit, the method is not limited thereto as long as the temperature of one point of the electric motor may be calculated. FIG. 6 is a view in which a configuration of an electric motor corresponds to a thermal equivalent circuit according to an exemplary embodiment.

Referring to FIG. 6, the rotor 120, the stator 110, the rotating shaft, and the magnetic flux barrier 123 of the electric motor may be adjusted based on the respective thermal equivalent circuits. Each thermal equivalent circuit may include a resistor, a capacitance, and a power source of a general electronic circuit. In addition, the heat quantity applied to the electric motor 100 by the controller 400 may also be expressed in a thermal equivalent circuit. According to the exemplary embodiment, the iron loss of the rotor 120 may be formed at a point P1 of the rotor 120, and the eddy current loss of the permanent magnet 122 may be formed at a point P2. The controller 400 may then be configured to obtain the temperatures of a predetermined point based on the heat quantities of heat applied to P1 and P2, and may be configured to calculate the temperatures of the permanent magnet 122 based on the temperatures of the predetermined points. As the thermal equivalent circuits illustrated in FIG. 6 are each merely exemplified for purposes of describing a corresponding component of the electric motor, the form of the circuit is not limited thereto as long as the flow of heat of each component may be represented.

In addition, the controller 400 may be configured to calculate the temperature of the permanent magnet 122 based on the temperature of one point of the rotor 120 and the stator 110. Particularly, when the heat quantity is generated by eddy current loss of the permanent magnet 122 and the temperature of the rotor 120 or the stator 110 of the motor 100 is measured, the controller 400 may be configured to calculate the temperature of the permanent magnet 122 using the resistance of the one point.

According to another exemplary embodiment, the controller 400 may be configured to calculate the temperature of the permanent magnet 122 based on the temperatures of at least two points of the electric motor 100. When the temperatures of two points are obtained, the heat quantity may be derived based on the above-described method, and the controller may be configured to calculate the temperature of the permanent magnet based on the resistance of the thermal equivalent circuit. Meanwhile, as the illustration for FIG. 6 is merely exemplified for purposes of describing the thermal equivalent circuits, the form of the thermal equivalent circuit corresponding to each component of the electric motor is not limited thereto.

Figure 7:
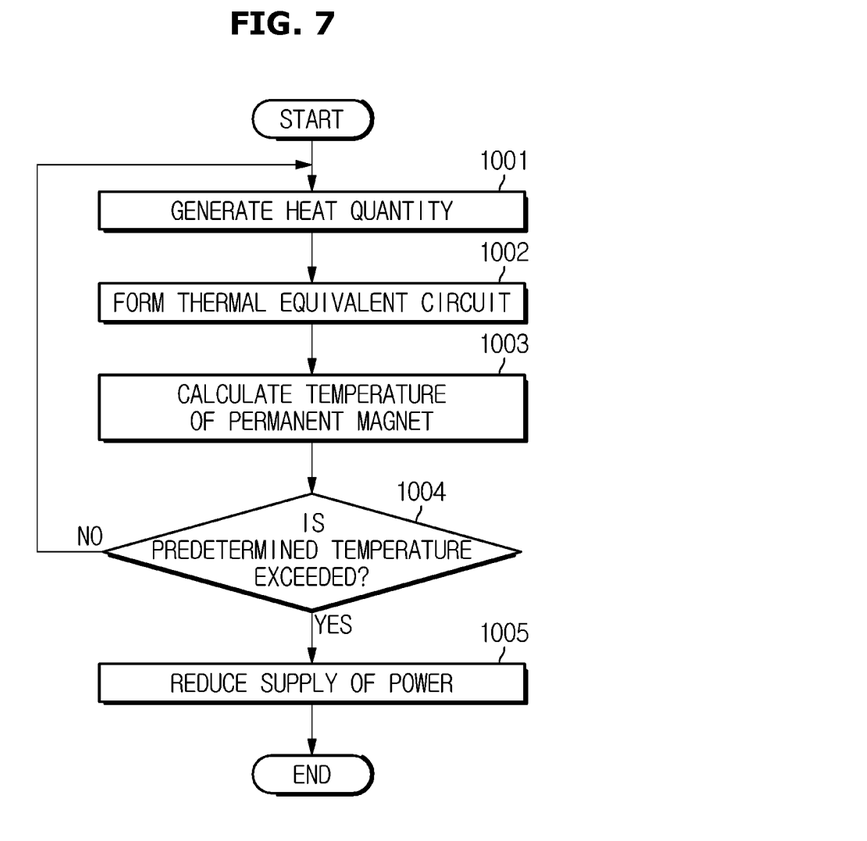
FIG. 7 is a flowchart showing a method of controlling a vehicle according to an exemplary embodiment.

FIG. 7 is a flowchart showing a method of controlling a vehicle according to an exemplary embodiment. Referring to FIG. 7, the controller may be configured to supply the heat quantity of heat to the electric motor using the inverter (1001). The controller may form a thermal equivalent circuit model of the electric motor (1002). Based on the thermal equivalent circuit model, the controller may be configured to calculate the temperature of the permanent magnet (1003). When the calculated temperature of the permanent magnet exceeds a predetermined temperature (1004), the controller may be configured to reduce the amount of power supplied to the electric motor using the inverter (1005).

Meanwhile, the disclosed exemplary embodiments may be embodied in the form of a recording medium storing instructions executable by a computer. The controller here may thus be programmed to execute the method described herein. The instructions may be stored in the form of program code and, when executed by a processor, may generate a program module to perform the operations of the disclosed exemplary embodiments. The recording medium may be embodied as a non-transitory computer-readable recording medium. The non-transitory computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A vehicle, comprising:
   an electric motor including a stator, a rotor, and a permanent magnet;
   an inverter configured to drive the electric motor; and
   a controller configured to:
     generate a predetermined quantity of heat by supplying power to the electric motor through the inverter;
     measure a temperature of at least one the rotor; and
     calculate a temperature of the permanent magnet based on a previously measured temperature of the at least one point of the rotor, and reduce supply of the power when the temperature of the permanent magnet exceeds a predetermined temperature.

2. The vehicle of claim 1, wherein the controller is configured to generate iron loss of the rotor and eddy-current loss of the permanent magnet using the inverter.

3. The vehicle of claim 1, wherein the controller matches the electric motor to the thermal equivalent circuit including at least one electric component.

4. The vehicle of claim 3, wherein the controller forms a thermal model that corresponds to the rotor, the stator, and the permanent magnet using the thermal equivalent circuit.

5. The vehicle of claim 1, further comprising:
   a sensor configured to measure a temperature of at least one point of the rotor,
   wherein the controller is configured to generate a predetermined heat quantity of heat by supplying power to the electric motor using the inverter, calculate the temperature of the permanent magnet based on the temperature of the at least one point of the rotor measured using the sensor, and reduce supply of the power when the temperature of the permanent magnet exceeds a predetermined temperature.

6. The vehicle of claim 5, wherein the sensor is configured to measure temperatures of at least two points of the electric motor, and the controller is configured to calculate the temperature of the permanent magnet based on a difference between the temperatures of the at least two points.

7. The vehicle of claim 1, wherein the controller is configured to supply the electric motor with the power required for driving the electric motor.

8. A method of controlling a vehicle, comprising:
   generating, by a controller, a torque in an electric motor by supplying power to an electric motor using an inverter;
   measuring, by the controller, a temperature of at least one point of a rotor;
   calculating, by the controller, a temperature of a permanent magnet mounted within the electric motor based on a previously measured temperature of the at least one point of the rotor; and
   reducing, by the controller, the supply of the power when the temperature of the permanent magnet exceeds a predetermined temperature.

9. The method of claim 8, wherein the generating of the previously calculated amount of heat includes:
   generating, by the controller, iron loss of a rotor mounted within the electric motor and eddy-current loss of the permanent magnet using the inverter.

10. The method of claim 8, wherein the calculating of the permanent magnet includes matching the electric motor to a thermal equivalent circuit including at least one electric component.

11. The method of claim 10, wherein the calculating of the permanent magnet includes forming a thermal model corresponding to a rotor, a stator, and the permanent magnet using the thermal equivalent circuit.

12. The method of claim 8, further comprising:
   measuring, by the controller, a temperature of at least one point of a rotor,
   wherein the calculating of the permanent magnet includes:
     generating, by the controller, a predetermined heat quantity of heat by supplying power to the electric motor using the inverter; and
     calculating, by the controller, the temperature of the permanent magnet based on the temperature of the at least one point of the rotor measured using the sensor.

13. The method of claim 8, wherein measuring of the predetermined point of the electric motor includes measuring temperatures of at least two points of the electric motor, and the calculating of the temperature of the permanent magnet includes calculating the temperature of the permanent magnet based on a difference between the temperatures of the at least two points.

14. The method of claim 8, wherein the supplying of power to the electric motor includes supplying the electric motor with the power required for driving the electric motor.

* * * * *